(12) United States Patent
Lim (10) Patent No.: US 8,477,611 B2
(45) Date of Patent: Jul. 2, 2013

(54) METHOD AND APPARATUS FOR PACKET CLASSIFICATION USING BLOOM FILTER

(75) Inventor: Hyesook Lim, Seoul (KR)

(73) Assignee: EWHA University Industry Collaboration Foundation, Seoul (KR)

( * ) Notice: Subject to any disclaimer, the term of this patent is extended or adjusted under 35 U.S.C. 154(b) by 310 days.

(21) Appl. No.: 12/909,177

(22) Filed: Oct. 21, 2010

(65) Prior Publication Data

US 2011/0219010 A1 Sep. 8, 2011

(30) Foreign Application Priority Data

Mar. 3, 2010 (KR) .................. 10-2010-0019209
Aug. 24, 2010 (KR) .................. 10-2010-0081704

(51) Int. Cl.
*H04J 1/16* (2006.01)
*H04J 3/16* (2006.01)
*H04J 3/24* (2006.01)
*H04L 12/26* (2006.01)
*H04L 12/28* (2006.01)
*H04L 12/56* (2006.01)
*G06F 15/18* (2006.01)
*G06F 7/00* (2006.01)

(52) U.S. Cl.
USPC ...... 370/230; 370/389; 370/392; 370/395.32; 370/471; 370/475; 706/14; 707/747

(58) Field of Classification Search
USPC ............ 370/389, 471, 473, 230, 392, 395.32, 370/475; 706/14; 707/747
See application file for complete search history.

(56) References Cited

U.S. PATENT DOCUMENTS

2010/0040066 A1* 2/2010 Hao et al. .............. 370/395.31
2010/0169471 A1* 7/2010 Allan ........................ 709/223

OTHER PUBLICATIONS

Wang et al., Efficient dynamic packet filtering program based on shard-mode counting Bloom filter, Sep. 2009, Systems Engineering and Electronics, all pages.*
Lim et al., Tuple Pruning using Bloom filters for Packet Classification, Jun. 2010, Published by IEEE Computer Society, all pages.*
Dharmapurikar et al., Fast Packet Classification using Bloom filters, Dec. 2006, ANCS'06, all pages.*
Dharmapurikar, Sarang; Krishnamurthy, Praveen and Taylor, David E., "Longest Prefix Matching Using Bloom Filters", Journal IEEE/ACM Transactions on Networking (TON), Apr. 2006, vol. 14, Issue 2, pp. 397-409, IEEE Press, Piscataway, NJ, USA.
Waldvogel, Marcel; Barghese, George; Turner, Jon and Plattner, Bernhard, "Scalable High Speed IP Routing Lookups", Newsletter ACM SIGCOMM Computer Communication Review, Oct. 1997, vol. 27, Issue 4, pp. 25-36, ACM New York, NY, USA.

* cited by examiner

*Primary Examiner* — Un C Cho
*Assistant Examiner* — Jeremy Costin
(74) *Attorney, Agent, or Firm* — Grossman Tucker Perreault & Pfleger, PLLC (57) ABSTRACT

The present disclosure provides an apparatus and method for packet classification using a Bloom filter and includes determining a matching length of how long each field value of one or more fields in an input packet coincides with a field value of the corresponding field stored in a rule set by performing a field-by-field search on the fields in the input packet, and generating a tuple list made up of a combination of one or more of the matching length for the respective fields; selecting particular tuples existing in the rule set from the tuple list; filtering each of the selected tuples by using the Bloom filter; and searching for a best matching rule as a search pool exclusively within the tuples with the positive result of the filtering. According to the present disclosure, the object tuples to search can be substantially relieved to improve the searching performance.

19 Claims, 7 Drawing Sheets

METHOD AND APPARATUS FOR PACKET CLASSIFICATION USING BLOOM FILTER

TECHNICAL FIELD

The present disclosure relates to a method and apparatus for classifying packets using Bloom filter. More particularly, the present disclosure relates to a method and apparatus for packet classification that performs search exclusively on the probable tuples to match rule sets by using Bloom filter for filtering a tuple list generated based on information on field length matches.

BACKGROUND OF THE DISCLOSURE

The statements in this section merely provide background information related to the present disclosure and may not constitute prior art.

As a guarantee to provide the quality of service that application programs need, Internet routers have to use input packets' header information to determine the class of the packet before offering appropriate services applicable to the respective classes. The task of classifying a packet into a correct one of the classes is called packet classification, which is carried out by mainly using source IP address, destination IP address, source port number, destination port number, protocol field, and such.

Such packet classification has difficulties for the reasons below.

First of all, multi-dimensional searching is essential to the packet classification as the method for search varies from field to another. The IP address fields require the operation of longest matching scheme when the port number fields require a range matching scheme and the protocol field should be subject to an exact matching process. The necessity of simultaneous execution of diverse searching schemes extracts a complexity of the searching operation which in turn lowers search speed.

Second, extra processes are required to identify all the matching rules throughout the search operations and also elect the highest priority one of the rules.

Third, all of these operations must be in wire-speed to meet the packet input speed.

Consequently, many researches are currently attempting to speed up the router processing of the packets. In particular, to cope with the difficulty of the multi-dimensional searches, methods have been suggested to deal with limited fields as opposed to the entire fields trying to improve the searching speed which is represented by the method of tuple space search algorithm.

TABLE 1

| Rule No. | Source Prefix | Destination Prefix | Tuple |
|---|---|---|---|
| R0 | 1* | 1* | (1, 1) |
| R1 | 1* | 110* | (1, 3) |
| R2 | 01* | 00* | (2, 2) |
| R3 | 0* | 111* | (1, 3) |
| R4 | 111* | 110* | (3, 3) |
| R5 | 010* | 110* | (3, 3) |

Tuple space refers to a space due to combinations of lengths of the respective fields as exemplified by the rule set in Table 1 where rule R0 has a source prefix length of 1 and a destination prefix length of 1 and thus belongs to tuple (1, 1) and rule R1 has a source prefix length of 1 and a destination prefix length of 3 and thus belongs to tuple (1, 3).

If the tuple space is defined as in Table 1 by pairing the source prefix lengths with the destination prefix lengths, considering the lengths from 0 to 32 which a prefix may have, the number of tuples to make is 33×33=1089 at maximum. Therefore, with respective to each of the input packets in the router, it consumes much time to conduct a linear search on the entire tuples that possess at least one rule as was recognized by numerous studies to date of which the tuple pruning algorithm is most famous.

The tuple pruning algorithm attempts to improve the search performance by cutting down tuples unworthy of the search by using the search results of the individual fields. One-dimensional search is performed respectively for the source address field and the destination address field to get the result of information on matching prefix lengths, which are combined to form the tuples. In order to combine information of two field lengths, it is necessary to perform a cross-producting, which is a procedure to generate every possible number of tuple cases for the prefix lengths coinciding with the input after the respective field searches. However, because the resultant tuples of the cross-producting are combinations of the matching prefixes by the individual fields, it is susceptible to generate tuples that are not actually present in the rule set. Consequently, such tuples as being absent in the rule set are desired to be removed before deciding the object tuples to eventually search.

Figure 1:
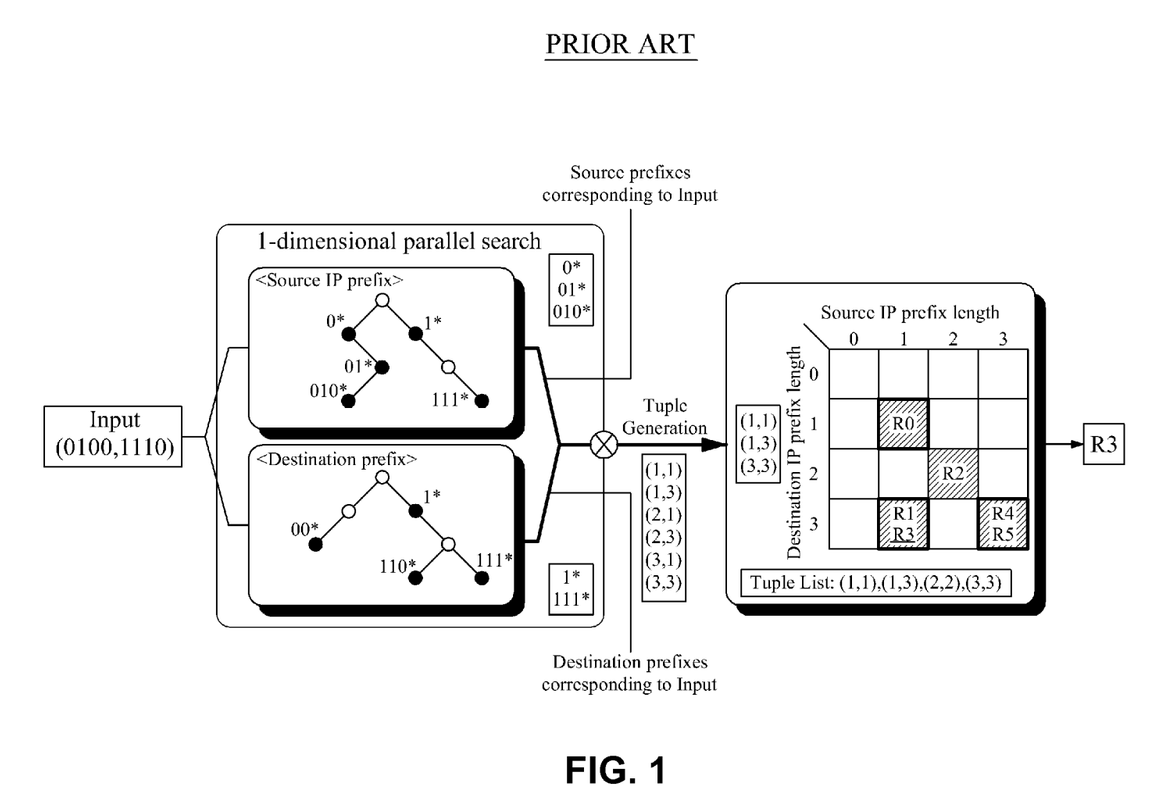
FIG. 1 is a diagram for illustrating conventional tuple pruning algorithm.

FIG. 1 is a diagram for illustrating conventional tuple pruning algorithm.

Such a typical algorithm has made a trie to perform a one-dimensional search against the rule set in Table 1 and stored the rules in a tuple space. The following description will be about the search procedure where the input packet's source address and the destination address are (0100, 1110) for an example.

The first step is to find every matching length by proceeding simultaneous individual searches on the source address field and the destination address field. The result of searching on the source address field is matches to 0*, 01*, and 010* and so the matching lengths are determined to be lengths 1, 2, and 3 while the destination address field has matches to 1* and 111* and then lengths 1 and 3 are determined as the matching lengths.

Cross-producting on the matching prefix length information from the one-dimensional search forms the total of six tuples including (1, 1), (1, 3), (2, 1), (2, 3), (3, 1), and (3, 3). By an incidental comparison with a previously stored tuple list, it is possible to remove those tuples that formed but not present in the rule set and they are tuples (2, 1), (2, 3), and (3, 1). Therefore, the surviving tuples are three including (1, 1), (1, 3), and (3, 3).

The search on the three tuples with respective to the input (0100, 1110) starts with a hashing-based search against tuple (1, 1) by applying as a hash key "01" that is a pair of a first bit of the first field with a first bit of the second field. Next comes a similar search against tuple (1, 3) for '0111' and lastly against tuple (3, 3) for '010111', thereby finding R3, which is the best matching rule (BMR). This field-by-field search with respect to given inputs would erase unworthy tuples of search, and hence improved the searching speed.

However, although the tuple pruning algorithm might have combinations of the prefix lengths available because they are there to determine the tuples, there were no ways to check the instances of the prefixes having distinct values. Of the filtered tuples (1, 1), (1, 3), and (3, 3) in this example, tuples (1, 1) and (3, 3) obviously accompanied the rules unmatched with the given input to cause the tuple searches in vain.

In other words, the tuple pruning algorithm holds an inherent drawback of low search performance because it gives rise to unnecessary tuple searching operations due to the tuple removals fully depending on the prefix length information.

In view of this problem, the present disclosure is to provide a method and apparatus for packet classification that performs a focused search on the probable tuples to match a rule set by using Bloom filter for filtering a tuple list generated based on information on field length matches.

DISCLOSURE OF THE INVENTION

In view of the above, one aspect of the present disclosure provides a method for packet classification including: determining a matching length of how long each field value of one or more fields in an input packet coincides with a field value of the corresponding field stored in a rule set by performing a field-by-field search, and generating a tuple list made up of a combination of one or more of the matching length for the respective fields; selecting particular tuples existing in the rule set from the tuple list; filtering each of the selected tuples by using a Bloom filter; and searching for a best matching rule as a search pool exclusively within the tuples with the positive result of the filtering. Here, the search pool represents a pool of items that are subject to search.

Another aspect of the disclosure provides an apparatus for packet classification including: a memory for storing a hash table provided with rules for the packet classification; a tuple generator for determining a matching length of how long each field value of one or more fields in an input packet coincides with a field value of the corresponding field stored in a rule set by performing a field-by-field search, generating a tuple list made up of a combination of one or more of the matching length for the respective fields, and selecting particular tuples existing in the rule set from the tuple list; and a packet classifying control for filtering each of the tuples selected by the tuple generator by using a Bloom filter, accessing the hash tables recognizing a search pool exclusively within the tuples with the positive result of the filtering and searching for the best matching rule.

According to the present disclosure, it becomes possible to reduce the object tuples to search through using not only the prefix length information but also the prefix value information, and hence less memory accesses can enhance the search performance.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Hereinafter, the exemplary aspects of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

<Construction of Present Disclosure>

A method for packet classification according to an aspect of the present disclosure includes steps of (a) generating a tuple list, (b) selecting from the tuple list particular tuples that exist in a rule set, (c) filtering using Bloom filter, and (d) rule searching.

The detailed description will be presented below referring to FIG. 2.

Figure 2:
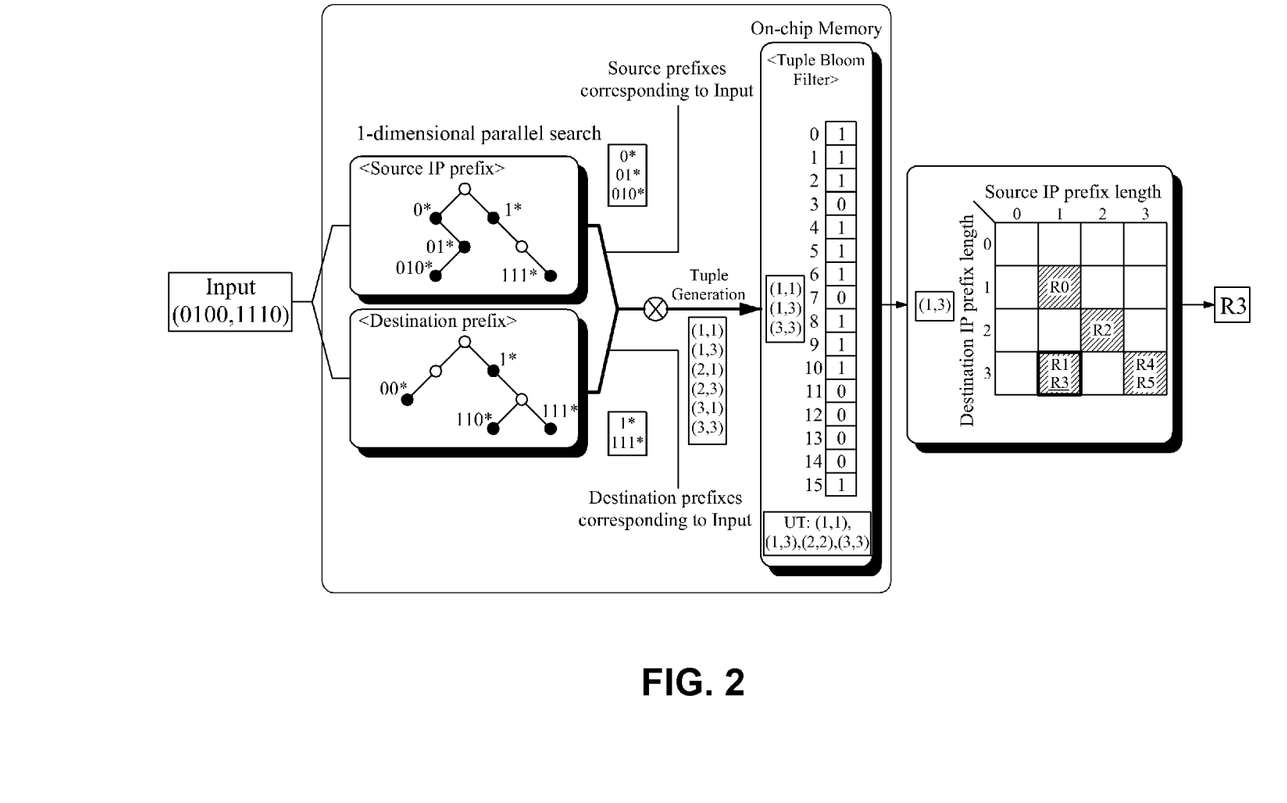
FIG. 2 is a diagram for illustrating a method for packet classification using Bloom filter according to an aspect of the present disclosure.

FIG. 2 is a diagram for illustrating a method for packet classification using Bloom filter according to an aspect of the present disclosure.

In the disclosed aspects, the use of the source prefix field and destination prefix field is illustrated for an example in the tuple generations and rule searches. But, this is solely for the sake of facilitating the description and not in any ways to limit the idea presented by the disclosure. Specifically, it is limitless to appropriately select the type and number of the fields used for the tuple generations and rule searches without departing from the technical scope of the present disclosure. For example, where there are two fields to use, it is possible to take the source port number field and destination port number field, whereas if there are three fields to use, the candidates may be the source prefix field, destination prefix field, and source port number field or such. Furthermore, four or five fields may be used.

(a) Generating A Tuple List

In this step, field-by-field searches are performed against the input packet's respective source address field and destination address field to generate a tuple list made up of combinations of matching lengths by each of fields.

Specifically, the source address field values in the input packet are compared with the source prefix field values stored in the rule set to determine whether these field values coincide with each other, and the destination address field values in the input packet are compared with the destination prefix field values stored in the rule set to determine whether these field values coincide with each other.

For example, assuming the input packet's source address and the destination address are (0100, 1110) as shown in FIG. 2 as the rule set equals to Table 1, the input packet source address matches the rule set source prefixes 0*, 01*, and 010* and so the matching lengths are determined to be lengths 1, 2, and 3. In addition, the input packet destination address matches the rule set destination prefixes 1* and 111* and so the matching lengths become 1 and 3.

Therefore, the tuples made of the combinations or pairs of the matching lengths of the source address field and the destination address field become (1, 1), (1, 3), (2, 1), (2, 3), (3, 1), and (3, 3), and these tuples make up a tuple list.

Here, the field-by-field search against the individual fields may be performed by one-dimensional search of the binary search on level (M. Waldvogel, G. Varghese, J. Turner, and B. Plattner, "Scalable high speed IP routing lookups," *ACM SIGCOMM*, pp. 25-35, 1997).

(b) Selecting Tuples

In this step, of the tuples within the tuple list, particular ones that are present in the rule set are selected.

For example, all the tuples within the Table 1 rule set are (1,1), (1,3), (2,2), and (3,3). Hence, of the totally six tuples (1,1), (1,3), (2,1), (2,3), (3,1), and (3,3) generated with respect to the input (0100, 1110), the selection will be focused to be (1,1), (1,3), and (3,3) less the tuples (2,1), (2,3), and (3,1) absent in the rule set as shown in FIG. 2.

(c) Filtering with Bloom Filter

The Bloom filter is adapted to filter the selected tuples in step (b) of selecting tuples to pick the tuples exclusively within the selection with the positive result of the filtering.

The Bloom filter is a bit vector to perform membership tests or identify an input that belongs to a particular set by previously programming the bit values of elements of the particular set to be 1, and in response to an input received determining whether the corresponding bit values to the input is 1 through a process of querying. If the bit value is 1, it is determined that the input is probable to belong to the particular set which is called "positive", and if the bit value is 0, the input is counted as a nonmember which is called "negative".

To carry out the filtering with the Bloom filter, a preliminary procedure to program the respective rules in the rule set into the Bloom filter which is described below with reference to Table 2.

TABLE 2

| Rule No. | Source Prefix | Destination Prefix | Tuple | Concatenated String | Hashing Code | BF Index (MSB, LSB by 4 bits) |
|---|---|---|---|---|---|---|
| R0 | 1* | 1* | (1, 1) | 11 | 01101001 | 6, 9 |
| R1 | 1* | 110* | (1, 3) | 1110 | 10000010 | 8, 2 |
| R2 | 01* | 00* | (2, 2) | 0100 | 01101100 | 6, 10 |
| R3 | 0* | 111* | (1, 3) | 0111 | 00000101 | 0, 5 |
| R4 | 111* | 110* | (3, 3) | 111110 | 00010100 | 1, 4 |
| R5 | 010* | 110* | (3, 3) | 010110 | 10101111 | 10, 15 |

Table 2 is to illustrate a method of programming the Bloom filter with respect to the Table 1 rule set.

First, a concatenation is performed between each rule's source prefixes and destination prefixes to generate a string. For example, in case of rule R0, its source prefix is 1* and destination prefix is 1* and thus the string for R0 becomes 11. In case of R1, source prefix and destination prefix are respectively 1* and 110*, which are concatenated or paired to generate a string of 1110. Two prefixes are in concatenation for use herein, although it is not a limitation to adhere to.

When strings are made in this way for the entire rules, they are used as inputs to a hash function in order to generate hashing codes. In the disclosed aspects, a cyclic redundancy check generator or CRC generator is used as the hash function.

The CRC generator may receive inputs of various lengths of strings to generate the hashing codes of a fixed length. Therefore, out of the fixed length hashing codes generated in the CRC generator, it is possible to extract desired lengths and desired number of hashing indices.

Figure 6:
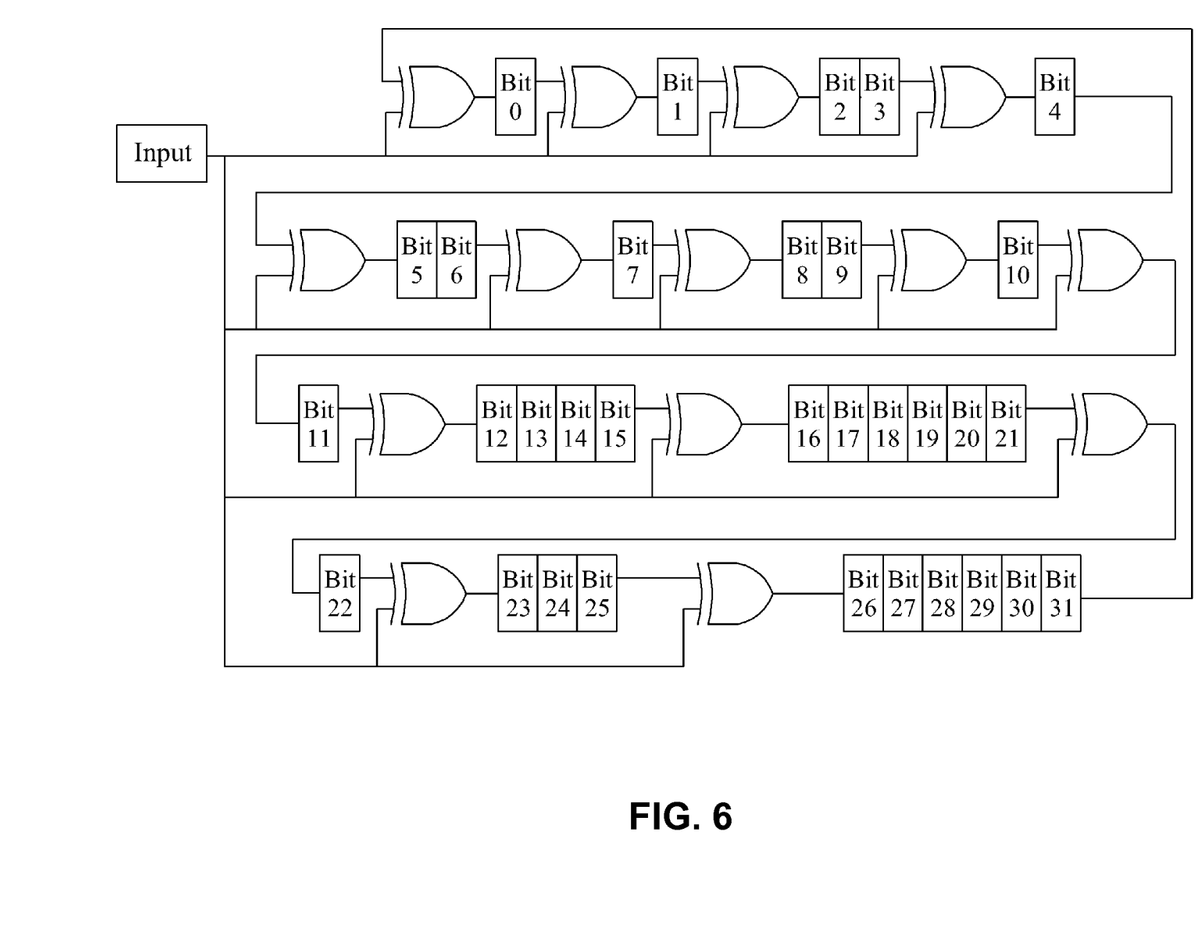
FIG. 6 is a diagram for illustrating a 32-bit CRC generator used in an aspect of the present disclosure.

Describing the operation of the CRC generator with reference to FIG. 6 showing the construction of a 32-bit CRC generator, all of flip-flops therein are initialized to zero, and in response to bit-by-bit receipts of an input value, flip-flop stored values are XORed with the input bit values until the last bit is received, when the CRC generator stops operating and the respective flip-flop stored values are output as CRC codes, whereby 32-bit fixed length hashing codes are obtained.

In Table 2, the "Hashing Code" category shows CRC codes which are obtained by feeding the CRC generator with the string generated through concatenations of two prefixes with respect to each of the rules assuming that 8-bit CRC generator is used.

Out of the hashing codes obtained, hashing indices are generated to program the Bloom filter. For example, by extracting the most significant 4 bits and the least significant 4 bits of the hashing code "01101001" obtained in the CRC generator with respect to R0, obtained are "0110" (6) and "1001" (9) which renders the bit values of the Bloom filter's 6th and 9th entries programmed into 1.

In Table 2, "BF index" represents the thus generated hashing indices, which have the Bloom filter programmed as illustrated in FIG. 2.

The resultant programmed Bloom filter is used to perform filtering on the select tuples in step (b) of selecting tuples.

With regard to input (0100, 1110), to describe the procedure of filtering those tuples (1, 1), (1, 3), and (3, 3) from step (b) of selecting tuples, it starts with generating a hashing index for the respective tuples. For example, since tuple (1, 1) represents that both the source address and destination address have the matching length 1, higher order 1 bit is extracted from each of the source address and destination address of the input (0100, 1110) to generate a string "01" for use as an input to the hash function. In case of tuple (1, 3), the source address and destination address have the matching lengths of 1 and 3 respectively, and so extractions of a higher order 1 bit from the source address and higher order 3 bits from the destination address are made to generate a string "0111". When tuple (3, 3) is made to run through the same procedure, a string "010111" is generated.

The strings "01", "0111" and "010111" respectively corresponding to tuples (1, 1), (1, 3), and (3, 3) are inputted to an 8-bit CRC generator to obtain hashing codes, which are "10110001", "00000101", and "00011110".

Extractions of the most significant 4 bits and the least significant 4 bits respectively from hashing code "10110001" generated by the string "01" of the tuple (1, 1) may provide hashing indices "1011" (11) and "0001" (1). Hence, by using these hashing indices, accesses are made to the Bloom filter's 1st entry and 11th entry to identify such bit values in the respective entries that the 1st entry has the bit value of 1 and the 11th entry has the bit value of 0, determining the tuple (1, 1) is not included in the rule set. Therefore, the tuple (1, 1) is eliminated from the search pool.

Next, similarly extracting the most significant 4 bits and the least significant 4 bits respectively from hashing code "00000101" generated by the string "0111" of the tuple (1, 3) may provide hashing indices "0000" (0) and "0101" (5). Using these hashing indices, the Bloom filter's 0-th entry and 5th entry are accessed to identify the bit values of both the 0-th and 5th entries as being 1, and thus the tuple (1, 3) representation of (0*, 111*) is probable to be present in the rule set. Therefore, the tuple (1, 3) becomes subject to the search.

Lastly, when filtering the tuple (3, 3) in the same way as above, since hashing code "00011110" represents at its most significant 4-bit hashing index that the 1st entry has the bit value of 1 and represents at its least significant 4-bit hashing index that the 14th entry has the bit value of 0, it is determined that the tuple (3, 3) is not included in the rule set, and thus it is eliminated from the search.

(d) Searching for the Rule

In this step, the tuples being subject to search are narrowed down to positive tuples that results from the filtering at the Bloom filter and the decision is made on the best matching rule (BMR) to the input packet.

To describe this in more detail with reference to Table 2, firstly by using the hashing indices used for programming the Bloom filter, rules are stored in the corresponding hash table entries. Here, though it is possible to use both of the hashing indices used for the Bloom filter programming, the instant embodiment takes one of the two hashing indices. Assuming the case of storing a rule with the hashing index generated by extracting the most significant 4 bits from a hashing code, the hash table's sixth entry has the rule R0 stored therein, the eighth entry has R1, and every one of the rules R2 to R5 is stored in the respective entries directed by the first hashing index.

In previous step (c) of filtering with Bloom filter, tuple (1, 3) was singled out in the search pool. For this reason, the search is performed by using "0000" (0) that is the hashing index for the tuple (1, 3), whereby the hashing table's 0-th entry stores the rule R3, which corresponds to the input packet (0*, 111*) and is entitled to be the best matching rule.

In the described step (d) of searching for the rule, the same hashing index is used to access both the Bloom filter and the hash table. However, the present disclosure is not so limited but accommodates the use of hashing indices of distinct values for the Bloom filter and the hash table.

The Bloom filter as used in the present disclosure may possibly determine presence of a specific value in a specific set even though it actually is not present which is referred to as "false positive" but precludes the instance of determining absence of an actual presence of a specific value in a specific set even though it actually is present. Therefore, with the disclosed packet classification method using the Bloom filter, useless tuple searches and the search performance loss therefrom can be prevented.

As is evident by the result from the Table 1 rule set example, the existing tuple pruning algorithms treat all of the tuples (1, 1), (1, 3) and (3,3) as the search pool as opposed to the present disclosure with the focused search pool of the single tuple (1, 3). In this way, the major reduction in the access number to external memories mean the substantial enhancement of the packet classifying search performance offered.

Meanwhile, the described aspect of the embodiment recites the generating two hashing indices for each of the tuples, although this is not to limit the disclosure and it is rather optional to use a single hashing index or three or more indices. In other words, as far as the disclosed packet classification method or its equivalent is employed, using any number of hashing indices is within the scope of the technical idea of the present disclosure.

Table 3 is an example of using three hashing indices.

TABLE 3

| Rule No. | Source Prefix | Dest. Prefix | Tuple | Concate. String | CRC Code | BF index |
|---|---|---|---|---|---|---|
| R0 | 1* | 1* | (1, 1) | 11 | 01101001 | 13, 26, 9 |
| R1 | 1* | 110* | (1, 3) | 1110 | 10000010 | 16, 0, 2 |
| R2 | 01* | 00* | (2, 2) | 0100 | 01101100 | 13, 27, 12 |
| R3 | 0* | 111* | (1, 3) | 0111 | 00000101 | 0, 1, 5 |
| R4 | 111* | 110* | (3, 3) | 111110 | 00010100 | 2, 5, 20 |
| R5 | 010* | 110* | (3, 3) | 010110 | 10101111 | 21, 11, 15 |

Equation 1 is known to give the number of the optimized hash functions in programming the Bloom filter, where M is the size of the Bloom filter, N the number of elements to be stored in the Bloom filter, and k the number of hash functions for use in the programming (Sarang Dharmapurikar, Praveen Krishamurthy, and David E. Taylor, "Longest prefix matching using bloom filters," *IEEE/ACM Transactions on Networking*, vol. 14, no. 2, pp. 397-409, April 2006).

$$k = \frac{M}{N}\ln 2 \quad \text{[Equation 1]}$$

Therefore, assuming that the Bloom filter size M is 32 bits for 6 distinct combinations in prefix values, the number of the optimized hash functions in programming the Bloom filter is determined to be 3 according to Equation 1. Table 3 shows the hashing indices generated by using [7:3], [6:2], and [4:0] bits. In the example case of R0, of the 8-bit CRC generator output of CRC code "01101001", [7:3] bit is "01101", [6:2] bit "11010", and [4:0] bit "01001", and thus the hashing indices become 13, 26, and 9.

The following will describe a packet classification apparatus for implementing the packet classification method using the Bloom filter according to an aspect.

Figure 3:
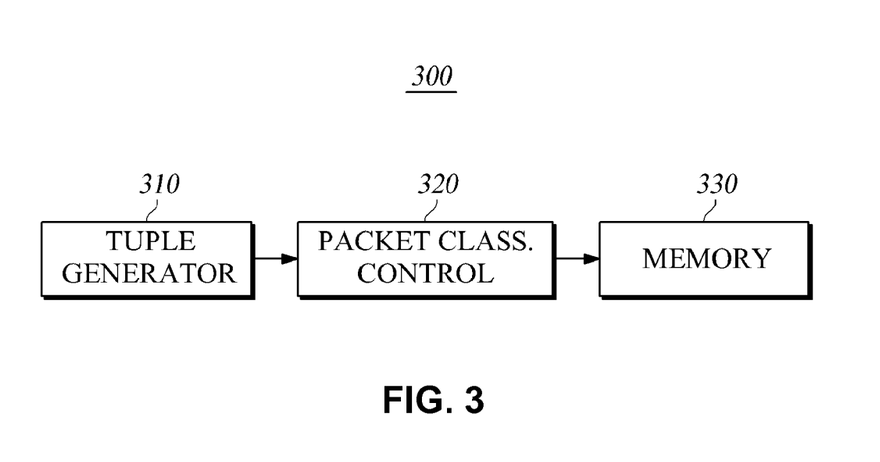
FIG. 3 is a block diagram for illustrating an apparatus for packet classification using Bloom filter according to an aspect of the present disclosure.

FIG. 3 is a block diagram for illustrating the apparatus 300 for packet classification using Bloom filter according to an aspect of the present disclosure.

The packet classification apparatus using the Bloom filter 300 according to an aspect comprises a tuple generator 310, a packet classifying control 320, and a memory 330.

Tuple generator 310 is basically a module to perform among the explained packet classification method the (a) step of generating a tuple list and (b) step of selecting tuples. In other words, it performs searches respectively on the input packet's source address field and destination address field and determines matching lengths to the field values of the corresponding fields in the rule set to generate a tuple list composed of combinations of matching lengths of the respective fields, and thereby selecting from the tuple list such tuples that present in the rule set.

Here, the field-by-field search which tuple generator 310 performs is the one-dimensional search utilizing the notably excellent binary search on level, which is not limiting.

Packet classifying control 320 is basically a module to perform step (c) of filtering with Bloom filter and step (d) of searching for the rule in the explained packet classification method. In particular, it performs filtering each of the tuples selected by tuple generator 310 by using a Bloom filter, accessing the hash tables stored in memory 330 recognizing a search pool exclusively within the tuples with the positive result of the filtering and searching decisively for the best matching rule among the stored rule in the hash table. The detailed construction of packet classifying control 320 will be described with reference to FIGS. 4 and 5.

Stored in memory 330 is a hash table provided with a rule for the packet classification.

Figure 4:
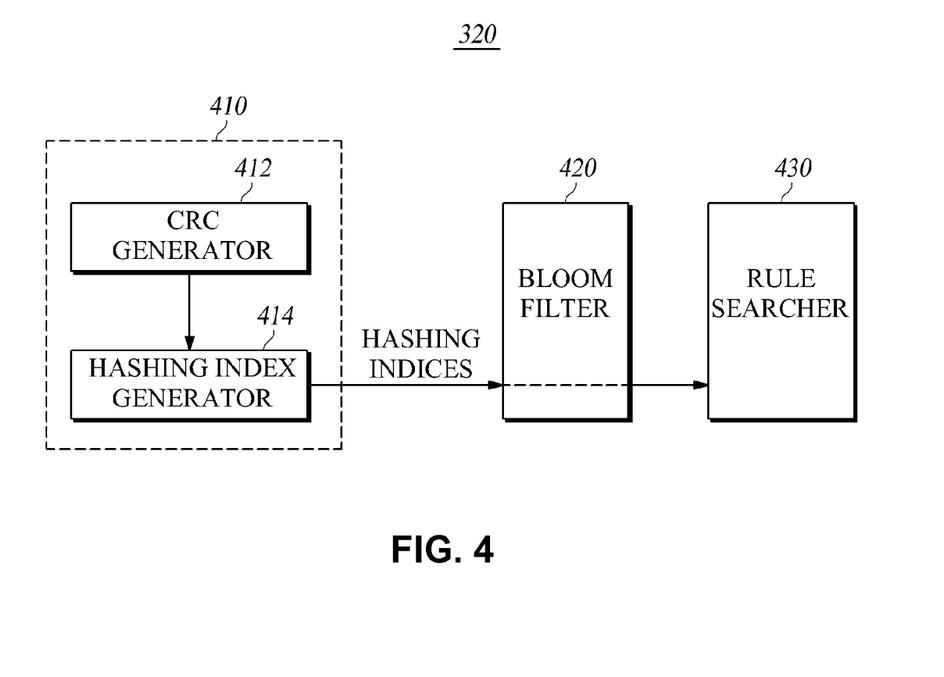
FIG. 4 is a block diagram for illustrating a configuration of a packet classifying control according to a first aspect.

FIG. 4 is a block diagram for illustrating a configuration of a packet classifying control according to a first aspect of the disclosure.

The first aspect of packet classifying control 320 comprises a hashing unit 410, a Bloom filter 420, and a rule searcher 430.

Hashing unit 410 generates a hashing index for each of the tuples selected by tuple generator 310 and may comprise a CRC generator 412 and a hashing index generator 414.

Cyclic redundancy check generator or CRC generator 412 generates a fixed length string upon receiving a string generated through extracting from the input packet's source address and destination address a higher order bit corresponding to the matching length represented by the selected tuples followed by a concatenation of the extracted bits.

Hashing index generator 414 generates a plurality of the hashing indices from the fixed length string generated by CRC generator 412. Hashing index generator 414 may extract from the fixed length string certain bits like several most significant bits and/or several least significant bits to generate one or a multitude of the hashing index.

Bloom filter 420 identifies the bit value of an entry indicated by the hashing indices generated by hashing index generator 414 to select only the tuples with the result of Bloom filter query being positive as the search pool.

Rule searcher 430 accesses the hash table entry indicated by the hashing indices of the tuples selected as the search pool in Bloom filter 420 to perform searching for candidate rules, and elect the best matching one of the rules matching the input packet.

Figure 5:
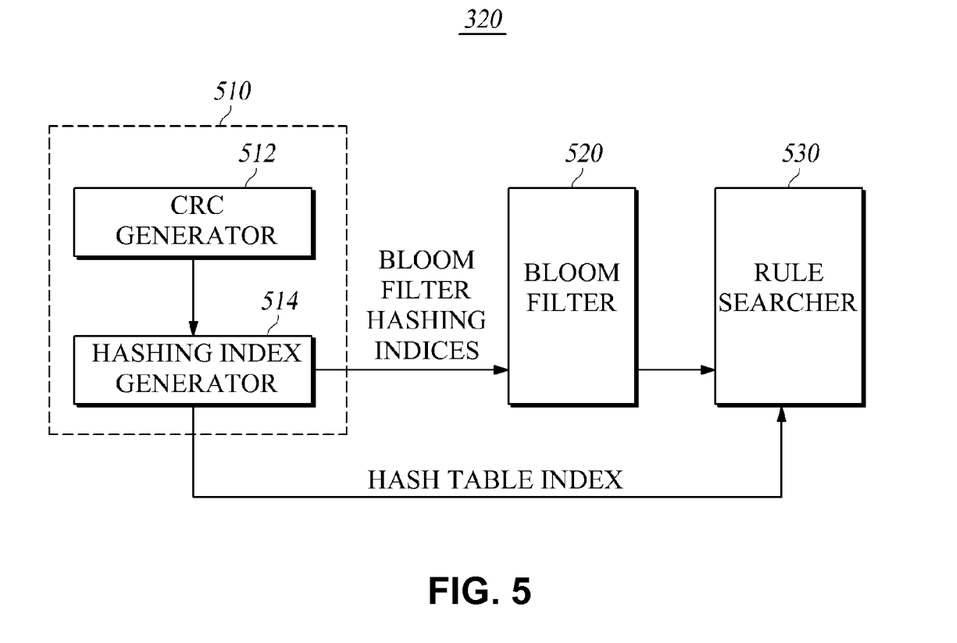
FIG. 5 is a block diagram for illustrating a configuration of a packet classifying control according to a second aspect.

FIG. 5 is a block diagram for illustrating a configuration of a packet classifying control according to a second aspect.

The second aspect of packet classifying control 320 has a hashing unit 510, which differs from the first aspect in that it separately generates Bloom filter hashing indices and a hash table index.

In particular, packet classifying control 320 has a CRC generator 512 for generating fixed length hashing codes and a hashing index generator 514 that uses such codes to separately generate the Bloom filter hashing indices and the hash table index. Here, there may be one or a plurality of Bloom filter hashing indices and the hash table index is singular.

Packet classifying control 320 also has a Bloom filter 520 for identifying the bit value of an entry indicated by the Bloom filter hashing indices to make a focused selection of the positives as the search pool and a rule searcher 530 for accessing a hash table entry indicated by the hash table index to search decisively the best matching one of the rules matching the input packet.

In the described aspect of the present disclosure, for use as hash function (CRC generator) input values to generate the hashing indices, a string was suggested through extracting a higher order bit corresponding to the matching length represented by the selected tuple from each of the source address and destination address followed by a concatenation of the extracted bits. However, this is merely an example and not intended to limit the present disclosure and various input values may be utilized as the hash function input values to generate the hashing indices.

For example, as a way to reduce the false positives occurring when the Bloom filter does the filtering, it is possible to use hash function input values generated through extracting a higher order bit corresponding to the matching length represented by the selected tuple from each of the source address and destination address and adding a predetermined bit pattern to the value of each of the extracted bits for padding the value with a fixed length value followed by a concatenation of the padded values.

Specifically, assuming the extracted value from the source address is "A", it is possible to provide for the hash function input value a 64-bit value generated through first affixing three bits of "101" as a trailer to "A" to repeat such "A101" pattern into the expansion of 32 bits while another extracted value B from the destination address goes through the similar expansion procedure to 32 bits and then concatenating these values.

Blooms filter's outputs occasionally become false positives due to a generation of the identical hashing index if the hash function inputs are same even at the mismatch of the input packet to the rule.

Assuming the stored rule is (1*, *), when based on the described aspect where the hash function input value for use is the string generated through extracting the higher order bit corresponding to the matching length represented by the tuple from each of the source address and destination address followed by the concatenation of the extracted bits, the hash function input string becomes '1'. If the input were (1100, 1000) and the field-by-field search provided tuple (0, 1), then the hash function input string for obtaining the hashing index of the corresponding input becomes '1' giving the same hashing index as the rule previously stored. However, the actually stored rule and the input have the tuple mismatch, and hence it can be identified that the tuple (0,1) of the corresponding input is false positive. If the stored rule were (1*, 0*) for another example, the hash function input string of this rule becomes '10', and in the case where the similar field-by-field search provides tuple (0, 2), the hashing index of the corresponding input also becomes '10', which is same as the stored rule. This becomes the case where the corresponding input having both the distinct tuple and distinct value from the stored rule still obtains the same hashing index causing the false positive.

The present method by using the padding decreases the frequency of false positive generations by increasing the probability of generating distinct hash function input values for the distinct tuples. Consequently, the number of memory accesses for the best matching rule can be reduced evenly further.

<Evaluation of Performance of Present Disclosure>

Using ClassBench known to have the similar rule set characteristics to those used in the real backbone routers, the presently proposed configuration went through a performance evaluation with ACL, IPC, and FW type rule sets having 5,000 rules.

Table 4 is about the characteristics of the respective rule sets used in the tests, showing the number of rules included in the rule sets, the number of distinctive tuples, and the number of distinct combinations in prefix values. While rule set ACL 5K has less distinct tuples due to smaller number of tuple types included than other rule sets, it is characterized by a large number of distinct combinations in prefix values within a tuple causing a large number of distinct combinations in field values. To the contrary, since rule set FW 5K has a variety of tuples as there are many rules with identical combinations in prefixes therein, it is characterized by a smaller number of distinct combinations in field values than other rule sets.

TABLE 4

| Rule Set | No. of Rules | No. of Distinct Tuples | No. of Distinct Combinations in Prefix Values |
|---|---|---|---|
| ACL 5K | 4660 | 102 | 2453 |
| IPC 5K | 4486 | 680 | 2933 |
| FW 5K | 4351 | 579 | 1244 |

Table 5 shows the performance of a tuple pruning algorithm with the tuple Bloom filter applied and is the result of a performance evaluation of the described aspect where the hash function input value for use is the string generated through extracting the higher order bit corresponding to the matching length represented by the tuple from each of the source address and destination address followed by the concatenation of the extracted bits.

TABLE 5

| Rule Set | No. of Inputs | $T_{Pruned}$ | M | No. of Indices | $T_{Neg}$ Negative | Tuple Bloom Filter Positive($T_{BF\_Pruned}$) True ($T_{BF\_2\text{-}field}$) | False ($T_{BF\_false}$) | Tuple Pruning Rate by Tuple BF (%) | True Match ($T_{true\_match}$) |
|---|---|---|---|---|---|---|---|---|---|
| ACL 5K | 13980 | 6.87 | N' | 1 | 1.79 | 3.87 | 1.22 | 26.01 | 3.29 |
| | | | 2N' | 1 | 2.36 | | 0.65 | 34.28 | |
| | | | 4N' | 3 | 2.90 | | 0.11 | 42.12 | |
| | | | 8N' | 6 | 2.96 | | 0.04 | 43.31 | |
| | | | 16N' | 11 | 2.96 | | 0.04 | 43.12 | |
| | | | 32N' | 22 | 2.94 | | 0.07 | 42.73 | |
| IPC 5K | 20610 | 15.29 | N' | 1 | 3.77 | 5.41 | 6.11 | 24.62 | 4.00 |
| | | | 2N' | 1 | 4.95 | | 4.93 | 32.35 | |
| | | | 4N' | 3 | 5.78 | | 4.10 | 37.81 | |
| | | | 8N' | 6 | 5.95 | | 3.93 | 38.89 | |
| | | | 16N' | 11 | 5.95 | | 3.93 | 38.90 | |
| | | | 32N' | 22 | 5.85 | | 4.03 | 38.26 | |
| FW 5K | 13054 | 8.37 | N' | 1 | 0.54 | 6.14 | 1.70 | 6.39 | 5.82 |
| | | | 2N' | 1 | 0.92 | | 1.31 | 11.03 | |
| | | | 4N' | 3 | 1.08 | | 1.15 | 12.92 | |
| | | | 8N' | 6 | 1.10 | | 1.14 | 13.05 | |
| | | | 16N' | 11 | 1.05 | | 1.18 | 12.50 | |
| | | | 32N' | 22 | 1.10 | | 1.14 | 13.08 | |

In this test, assuming N is the number of distinct combinations of prefix values, the dimensional unit N' of the tuple Bloom filter was defined as $2^{\lceil \log 2N \rceil}$. For the hash function, CRC-64 generator was used, and the number (k) of the hashing indices was made to increase in proportion to the Bloom filter size (M). For the field-by-field one-dimensional search, the recognized binary search on level (BSL) for its performance excellence was used.

In Table 5, $T_{Pruned}$ represents the average number of the surviving tuples when only the conventional tuple pruning algorithm is applied. $T_{BF\_Pruned}$ represents the memory accessing performance according to tuple Bloom filter size, and specifies the average number of tuples filtered negative by the tuple Bloom filter ($T_{neg}$), the average number of truly positive tuples ($T_{BF\_2\text{-}field}$) of the positive tuple results that have two identical fields used to make both the stored rule and the tuple, and the average number of false positive tuples ($T_{BF\_false}$) that passed the tuple Bloom filter but are not identical to the stored rule.

Tuple pruning rate by tuple BF represents in percentage the number of extra tuples the tuple Bloom filter can filter out further from the filtration by the conventional tuple pruning algorithm, and also provided is among the various tuple search results for an input the average number of tuples that finally and fully match the stored rule.

From Table 5 data, it can be seen that the proposed tuple Bloom filter takes the surviving tuples ($T_{Pruned}$) after the tuple pruning algorithm to additionally remove the tuples that are absent in the rule set, thereby decreasing the number of tuples actually accessing the memory that is ($T_{BF\_Pruned}$). In addition, the bigger the Bloom filter size M gets, the higher the rate of negative results goes, and thus $T_{BF\_Pruned}$, the number of the tuples that can pass the tuple Bloom filter gradually decreases as can be seen in the Table 5. The characteristic false positives of the Bloom filters also depend on the Bloom filter size M so that the false positives are reduced, which is inversely proportional to the number of false positives.

By true positives ($T_{BF\_2\text{-}field}$) herein, they mean within the Bloom filter passing positive results the cases where the input's source and destination prefix values are found identical as a result of accessing the hash table for comparison with the stored rule. While the average number of truly positive tuples remains the same regardless of the Bloom filter size, depending on the same, the average number of false positive tuples can be seen as changing.

Table 5 shows that the tuple pruning algorithm with the tuple Bloom filter applied implements the additional tuple removal function, thereby reducing the number of the memory accesses. However, despite the characteristics of the Bloom filter that its size increase would reduce the number of the false positives, it shows a specific size from which the false positives are not decreasing but converge. In particular, in the case of rule set IPC 5K or FW 5K, increasing the Bloom filter size causes a very little drop in the number of the false positive tuples.

In order to reduce the false positives, as described above, it is possible to use the hash function input values generated through extracting a higher order bit corresponding to the matching length represented by the tuple from each of the source address and destination address and adding a predetermined bit pattern to the value of each of the extracted bits for padding the value with a fixed length value followed by a concatenation of the padded values, and the result is shown in Table 6.

TABLE 6

| Rule Set | No. of Inputs | $T_{Pruned}$ | M | No. of Indices | Negative | Tuple Bloom Filter True ($T_{BF\_2\text{-}field}$) | Positive($T_{BF\_Pruned}$) False ($T_{BF\_false}$) | Pruned Tuple Ratio by Tuple BF (%) | True Match ($T_{true\_match}$) |
|---|---|---|---|---|---|---|---|---|---|
| ACL 5K | 13980 | 6.875 | N' | 1 | 1.707 | 3.868 | 1.301 | 24.82 | 3.29 |
|  |  |  | 2N' | 1 | 2.313 |  | 0.693 | 33.65 |  |
|  |  |  | 4N' | 3 | 2.918 |  | 0.089 | 42.44 |  |
|  |  |  | 8N' | 6 | 3.007 |  | 0.000 | 43.74 |  |
|  |  |  | 16N' | 11 | 3.007 |  | 0.000 | 43.74 |  |
|  |  |  | 32N' | 22 | 3.007 |  | 0.000 | 43.74 |  |
| IPC 5K | 20610 | 15.290 | N' | 1 | 4.979 | 5.411 | 4.901 | 32.56 | 4.00 |
|  |  |  | 2N' | 1 | 5.811 |  | 4.070 | 38.00 |  |
|  |  |  | 4N' | 3 | 9.013 |  | 0.867 | 58.95 |  |
|  |  |  | 8N' | 6 | 9.775 |  | 0.105 | 63.93 |  |
|  |  |  | 16N' | 11 | 9.778 |  | 0.102 | 63.95 |  |
|  |  |  | 32N' | 22 | 9.778 |  | 0.102 | 63.95 |  |
| FW 5K | 13054 | 8.374 | N' | 1 | 0.618 | 6.142 | 1.613 | 7.39 | 5.82 |
|  |  |  | 2N' | 1 | 1.232 |  | 0.999 | 14.71 |  |
|  |  |  | 4N' | 3 | 1.835 |  | 0.396 | 21.92 |  |
|  |  |  | 8N' | 6 | 1.916 |  | 0.315 | 22.88 |  |
|  |  |  | 16N' | 11 | 1.825 |  | 0.306 | 22.99 |  |
|  |  |  | 32N' | 22 | 1.925 |  | 0.306 | 22.99 |  |

In Table 6, the padding used is adapted to extend the prefix of each field into the fixed length of 32-bit. At this time, the length and the value are arbitrary, and in this test, the prefix of each field affixed with a trailer of three bits of "101" making a pattern of {prefix, 101} was repeatedly padded until 32 bits were reached.

As shown in Table 6, as a result of proceeding the search with the Bloom filter programmed using the indices obtained from extending the hash function inputs equally into 64-bit, when the Bloom filter is sized 4N', the number of false positives already dropped below 1.

Figure 7:
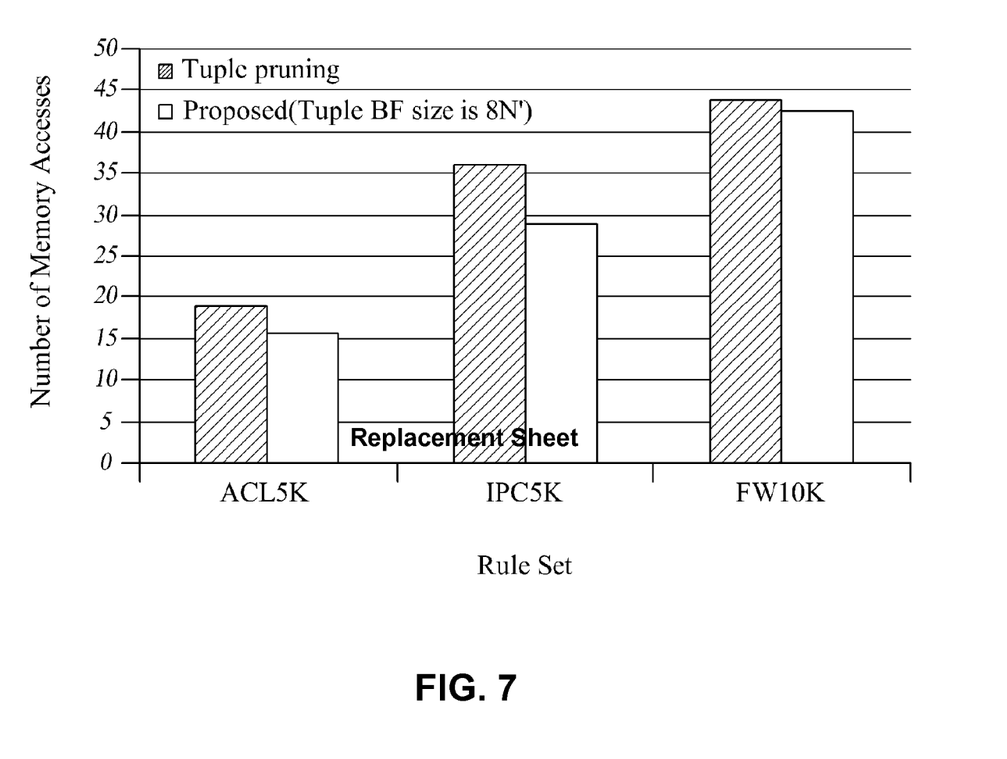
FIGS. 7, 8a and 8b are graphs for illustrating conventional tuple pruning algorithm and the present packet classification method in performance comparison with respect to memory accesses.
Figure 8A:
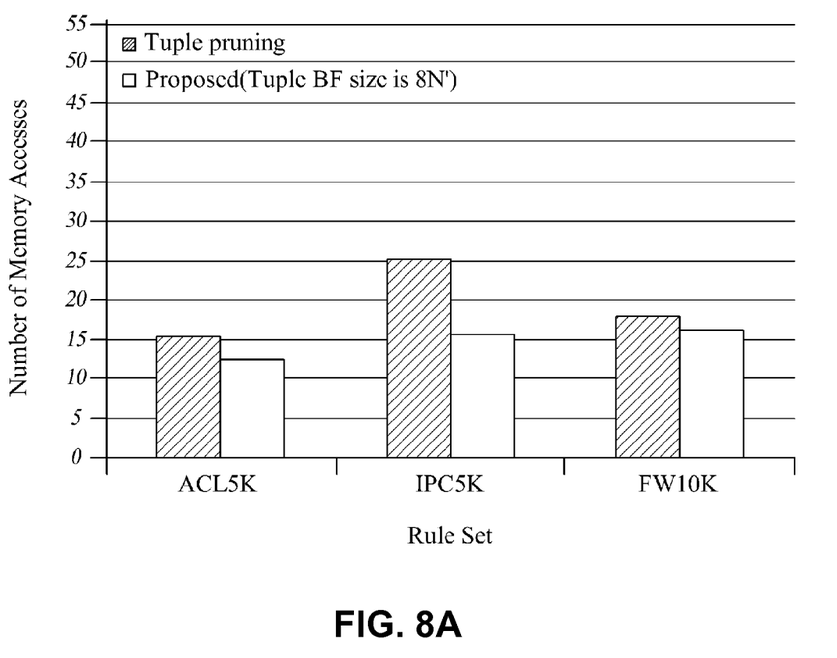
Figure 8B:
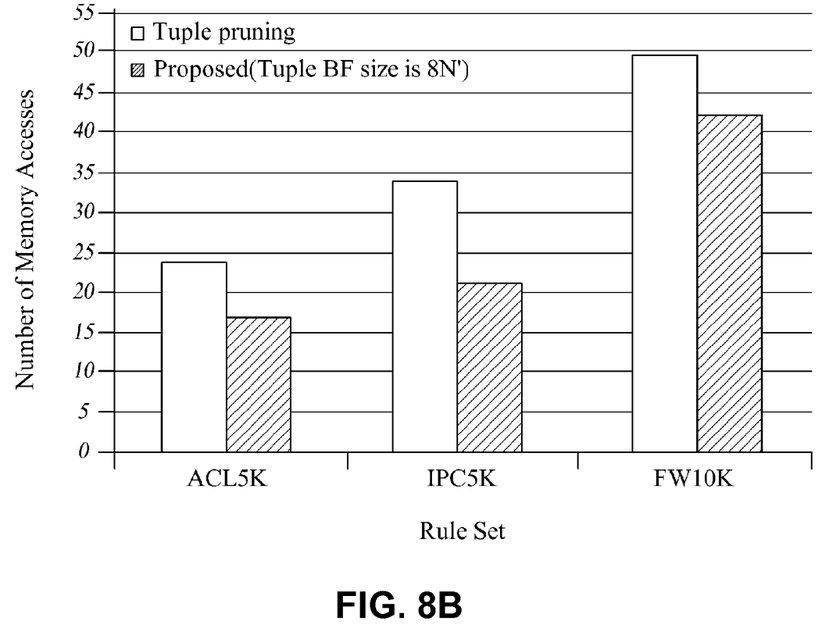

FIGS. 7, 8a, and 8b are graphs for illustrating conventional tuple pruning algorithm and the present packet classification method in performance comparison with respect to memory accesses.

FIG. 7 is the result of the disclosed aspect without using the padding as compared with the conventional tuple pruning algorithm.

The hash function used to evaluate the respective algorithms, that is, 64-bit CRC function may advantageously obtain an equal length of hashing codes regardless of the tuple types and extract a specific length of hashing indices therefrom, but as it is not a perfect hash function, collisions of identical hashing indices generated for different inputs may occur. In the performance test, at the event the hashing indices collided, they were joined and stored by linked-list, and at the time of searching linear searches were performed for the entries stored by the linked-list. The configuration in FIG. 7 clearly presents the effective packet classification, which goes beyond the conventional tuple pruning algorithm that limits the search area with only using the tuples composed of the combinations of the prefix length information toward an extra restriction of the searching area by using the Bloom filter of an on-chip memory of a little size (2~4 Kbyte), enabling a higher speed packet classification.

FIGS. 8a and 8b are the result of the disclosed aspect using the padding as compared with the conventional tuple pruning algorithm.

Here, FIG. 8a is a comparison graph for the case of assuming the hash function to be perfect having no events of collision, illustrating a reduction of 40% maximum in the number of accessing the external memories.

Meanwhile, because the CRC function is not the perfect hash function as described above, at the event the hashing indices collided, they were joined and stored by linked-list, and at the time of searching linear searches were performed for the entries stored by the linked-list, and the result is shown in FIG. 8b.

Referring to FIG. 8b, one can see a further enhancement of performance to FIG. 8a that assumed the perfect hash function.

In addition, compared with FIG. 7 using no padding, FIG. 8b assures the use of padding adds to the enhancement of performance.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Also, every one of the components may be implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

Also, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes. Accordingly, the scope of the disclosure is not to be limited by the above embodiments but by the claims and the equivalents thereof.

What is claimed is:

1. A method for packet classification comprising:
determining a matching length of how long each field value of one or more fields in an input packet coincides with a field value of a corresponding field stored in a rule set by performing a field-by-field search on the fields in the input packet, and generating a tuple list made up of combinations of one or more matching lengths for the respective fields;
selecting particular tuples existing in the rule set from the tuple list;
filtering each of the particular tuples by using a Bloom filter to produce positive tuples; and
searching for a best matching rule for the input packet based on a search pool including exclusively the positive tuples resulting from the filtering.

2. The method for packet classification in claim 1, wherein the step of filtering includes:
generating one or more hashing indices for each of the particular tuples; and
accessing Bloom filter entries indicated by the one or more hashing indices to identify bit values of the Bloom filter entries.

3. The method for packet classification in claim 2, wherein the step of searching for the best matching rule comprises:
accessing hash table entries indicated by at least one of the one or more hashing indices, and searching for at least one rule stored in the hash table entries; and
determining the best matching rule from among the at least one rule.

4. The method for packet classification in claim 2, wherein the one or more hashing indices are generated from a string generated through extracting from each of the fields higher order bits corresponding to the matching length represented by the particular tuple followed by a concatenation of the extracted bits.

5. The method for packet classification in claim 2, wherein the one or more hashing indices are generated from a string generated through extracting from each of the fields higher order bits corresponding to the matching length represented by the particular tuple and adding a predetermined bit pattern to the value of each of the extracted bits for padding the value with a fixed length value followed by a concatenation of the padded values.

6. The method for packet classification in claim 4, wherein the step of generating the one or more hashing indices includes:
providing the string to a cyclic redundancy check generator to generate a fixed length string; and
generating a plurality of the hashing indices from the fixed length string.

7. The method for packet classification in claim 1, wherein the one or more fields are source prefix field and destination prefix field.

8. The method for packet classification in claim 1, wherein the field-by-field search of the step of determining the matching length and generating the tuple list is a one-dimensional search using a binary search on level.

9. The method for packet classification in claim 2, wherein the step of searching for the best matching rule includes:
generating one or more hash table indices for the tuples within the search pool;
accessing hash table entries indicated by the one or more hash table indices and searching for rules within the hash table entries; and
determining the best matching rule among the rules searched within the hash table entries.

10. An apparatus for packet classification comprising:
a memory for storing a hash table provided with rules for the packet classification;
a tuple generator for determining a matching length of how long each field value of one or more fields in an input packet coincides with a field value of a corresponding field stored in a rule set by performing a field-by-field search on the fields in the input packet, generating a tuple list made up of a combination of one or more of the matching length for the respective fields, and selecting particular tuples existing in the rule set from the tuple list; and
a packet classifying control for filtering each of the particular tuples selected by the tuple generator by using a Bloom filter to produce positive tuples, and searching for a best matching rule for the input packet by accessing the hash table based on a search pool including exclusively the positive tuples resulting from the filtering.

11. The apparatus for packet classification in claim 10, wherein the packet classifying control includes:
a hash unit for generating one or more hashing indices for each of the selected tuples, wherein the Bloom filter identifies bit values of entries indicated by the one or more hashing indices to determine the search pool including only the positive tuples resulting from the search; and
a rule determiner for accessing hash table entries by using at least one of the one or more hashing indices corresponding to each of the tuples within the search pool to search for the rules stored in the hash table entries and determining the best matching rule from among the rules.

12. The apparatus for packet classification in claim 11, wherein the hash unit includes:
a cyclic redundancy check generator for generating a fixed length string upon receiving a string generated through extracting from each of the fields a higher order bit corresponding to the matching length represented by the particular tuples followed by a concatenation of the extracted bits; and
a hashing index generator for generating a plurality of the hashing indices from the fixed length string.

13. The apparatus for packet classification in claim 11, wherein the hash unit includes:
a cyclic redundancy check generator for generating a fixed length string upon receiving a string generated through extracting from each of the fields a higher order bit corresponding to the matching length represented by the particular tuple and adding a predetermined bit pattern to the value of each of the extracted bits for padding the value with a fixed length value followed by a concatenation of the padded values; and
a hashing index generator for generating a plurality of the hashing indices from the fixed length string.

14. The apparatus for packet classification in claim 10, wherein the packet classifying control includes:
a hash unit for generating one or more Bloom filter hashing indices and one or more hash table indices for each of the particular tuples, wherein the Bloom filter identifies bit values of entries indicated by the one or more Bloom filter hashing indices to determine the search pool including only the positive tuples resulting from the search; and a rule determiner for accessing hash table entries by using the one or more hash table indices corresponding to each of the tuples within the search pool to search for the rules stored in the hash table entries and determining the best matching rule from among the rules.

15. The apparatus for packet classification in claim 14, wherein the hash unit includes:

a cyclic redundancy check generator for generating a fixed length string upon receiving a string generated through extracting from each field value of the fields a higher order bit corresponding to the matching length represented by the particular tuples followed by a concatenation of the extracted bits; and a hashing index generator for generating a plurality of the Bloom filter hashing indices and a hash table index from the fixed length string.

16. The apparatus for packet classification in claim 14, wherein the hash unit includes:

a cyclic redundancy check generator for generating a fixed length string upon receiving a string generated through extracting from each of the fields a higher order bit corresponding to the matching length represented by the particular tuple and adding a predetermined bit pattern to the value of each of the extracted bits for padding the value with a fixed length value followed by a concatenation of the padded values; and a hashing index generator for generating a plurality of the Bloom filter hashing indices and one of the hash table indices from the fixed length string.

17. The apparatus for packet classification in claim 10, wherein the one or more fields are source prefix field and destination prefix field.

18. The apparatus for packet classification in claim 10, wherein the one or more fields are source port number field and destination port number field.

19. The apparatus for packet classification in claim 10, wherein the field-by-field search carried out in the tuple generator is a one-dimensional search using a binary search on level.

* * * * *